(12) United States Patent
Shemtov

(10) Patent No.: US 7,476,817 B1
(45) Date of Patent: Jan. 13, 2009

(54) CONNECTOR FOR AFFIXING CABLES WITHIN JUNCTION BOXES

(76) Inventor: Sami Shemtov, 1458 Commodore Way, Hollywood, FL (US) 33019

( * ) Notice: Subject to any disclaimer, the term of this patent is extended or adjusted under 35 U.S.C. 154(b) by 47 days.

(21) Appl. No.: 11/564,362

(22) Filed: Nov. 29, 2006

(51) Int. Cl.
*H02G 3/18* (2006.01)
*H01R 13/58* (2006.01)

(52) U.S. Cl. ....................... 174/661; 439/460
(58) Field of Classification Search ............... 439/460, 439/650, 660, 661; 174/661, 660, 650, 65 R
See application file for complete search history.

(56) References Cited

U.S. PATENT DOCUMENTS

| | | | |
|---|---|---|---|
| 1,106,761 A * | 8/1914 | Weikert et al. ............ 285/154.3 |
| 3,627,904 A * | 12/1971 | Milne ........................ 174/83 |
| 4,159,134 A | 6/1979 | Shemtov |
| 4,361,302 A * | 11/1982 | Lass ............................ 248/56 |
| 4,536,613 A * | 8/1985 | Gallas ........................ 174/660 |
| D287,396 S | 12/1986 | Shemtov |
| 4,641,863 A | 2/1987 | Shemtov |
| 4,880,387 A * | 11/1989 | Stikeleather et al. .......... 439/98 |
| 4,990,721 A * | 2/1991 | Sheehan .................... 174/660 |
| 5,373,106 A | 12/1994 | O'Neil et al. |
| 6,114,630 A | 9/2000 | Gretz |
| 6,352,439 B1 | 3/2002 | Stark et al. |
| 6,444,907 B1 | 9/2002 | Kiely |
| 6,476,319 B1 | 11/2002 | Shemtov |
| 6,555,750 B2 | 4/2003 | Kiely |
| 6,596,939 B1 | 7/2003 | Gretz |
| 6,616,194 B1 | 9/2003 | Gretz |
| 6,682,355 B1 | 1/2004 | Gretz |
| 6,709,280 B1 | 3/2004 | Gretz |
| 6,737,584 B2 | 5/2004 | Kiely |
| 6,767,032 B1 | 7/2004 | Gretz |
| 6,808,181 B1 | 10/2004 | Shemtov |
| 6,835,088 B2 | 12/2004 | Shemtov |
| 6,849,803 B1 | 2/2005 | Gretz |

(Continued)

OTHER PUBLICATIONS

Bridgeport Connectors advertisement, "The New 38 Speacial—Snap In, Save Time," date unknown (believed 2004 or earlier).

(Continued)

*Primary Examiner*—Michael C Zarroli
*Assistant Examiner*—Vladimir Imas
(74) *Attorney, Agent, or Firm*—Craig A. Fieschko, Esq.; DeWitt Ross & Stevens S.C.

(57) ABSTRACT

A connector for affixing cables within an electrical box has a body with an insertion end and an opposing receiving end. The insertion end bears outwardly-sloping legs resembling leaf springs, with each leg bearing a channel, so that an electrical box wall may slide over the insertion end with the legs flexing inwardly until the electrical box wall snaps into the channels. The receiving end bears prongs which slope inwardly into an inner body passage, with the prongs also resembling leaf springs, so that the prongs flex outwardly as a cable is inserted into the passage, but at the same time they resiliently flex inwardly to grasp the cable. The body may be formed of a piece of sheet material cut to define a series of petal-like body sections surrounding the insertion end, with the body sections then being bent about the insertion end to define a generally cylindrical body.

20 Claims, 2 Drawing Sheets

U.S. PATENT DOCUMENTS

| | | |
|---|---|---|
| 6,872,886 B2 | 3/2005 | Kiely |
| 6,916,988 B1 | 7/2005 | Auray et al. |
| 6,939,160 B2 | 9/2005 | Shemtov |
| 6,957,968 B1 | 10/2005 | Gretz |
| 7,045,714 B1 | 5/2006 | Kiely |
| 7,057,107 B2 | 6/2006 | Auray et al. |
| 7,060,900 B1 | 6/2006 | Gretz |
| 7,064,272 B2 | 6/2006 | Auray et al. |
| 7,064,273 B1 | 6/2006 | Kiely |
| 7,075,007 B2 | 7/2006 | Auray et al. |
| 7,080,859 B1 | 7/2006 | Gretz et al. |
| 7,126,064 B1 | 10/2006 | Shemtov |
| 2005/0269122 A1* | 12/2005 | Pyron ................ 174/65 R |

OTHER PUBLICATIONS

Arlington Industries advertisement, "SNAP2IT Connectors," pp. E1-E3, date unknown (believed 2004 or earlier).

* cited by examiner

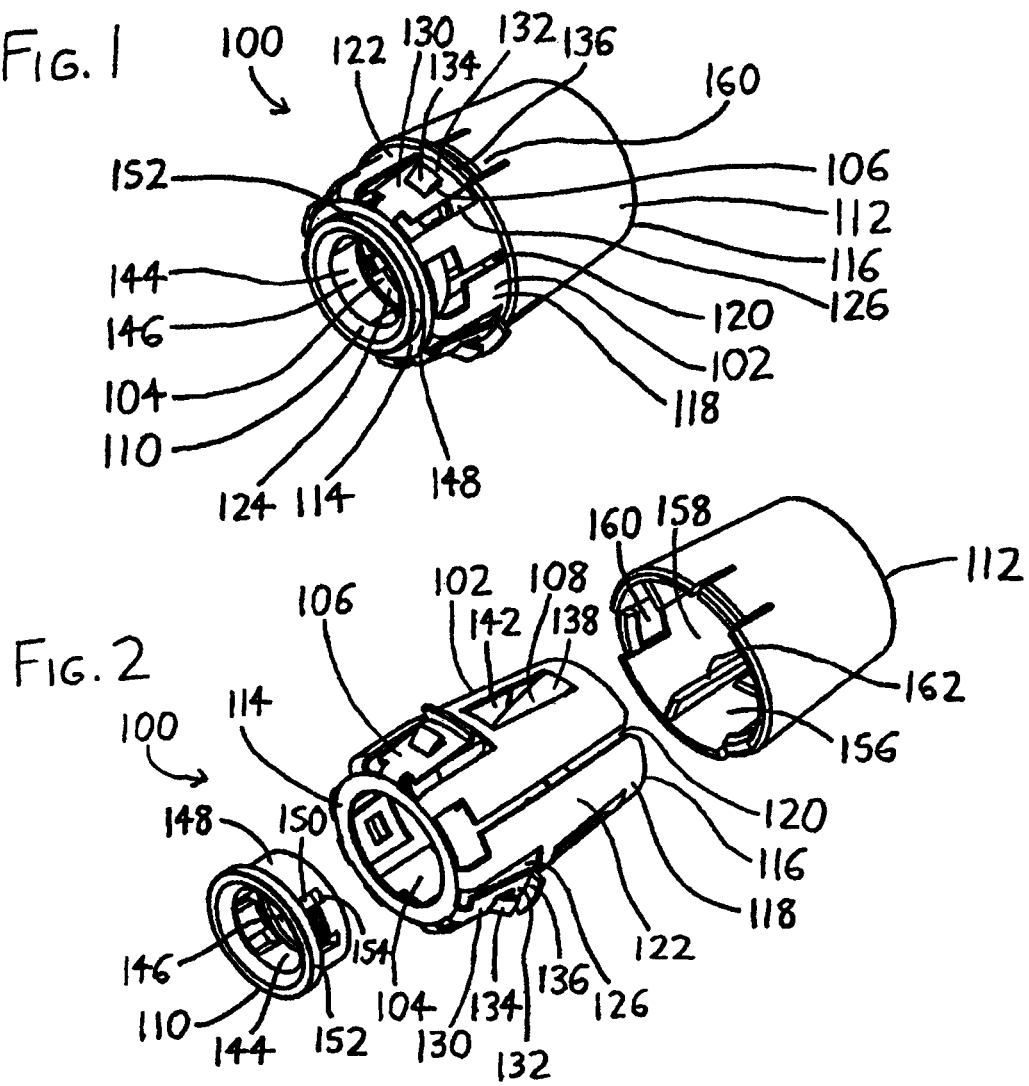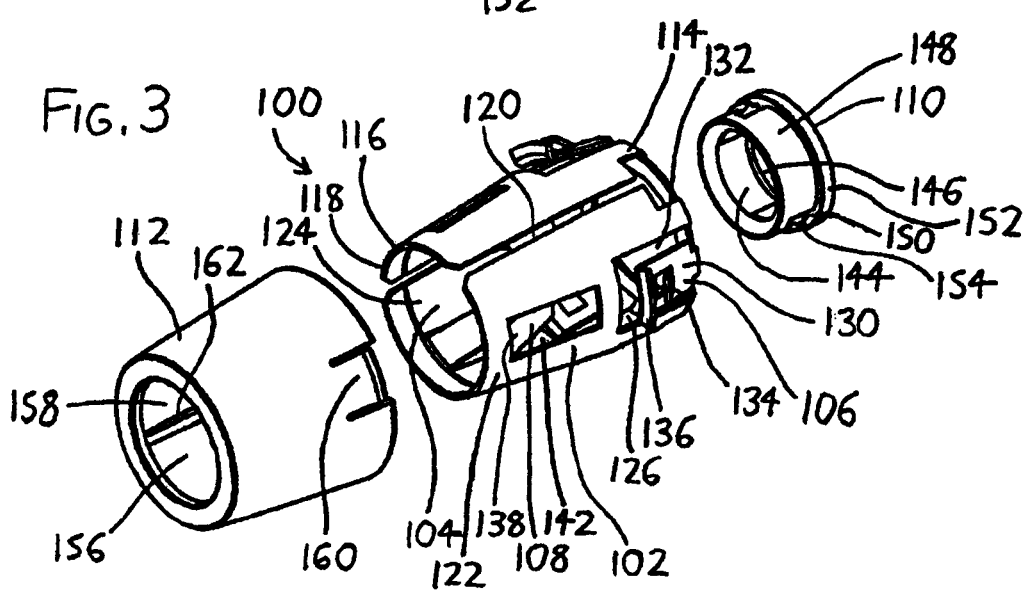

CONNECTOR FOR AFFIXING CABLES WITHIN JUNCTION BOXES

FIELD OF THE INVENTION

This document concerns an invention relating generally to electrical wiring components, and more specifically to connectors for securing electrical cables to electrical junction boxes.

BACKGROUND OF THE INVENTION

In the electrical trade, junction boxes—small boxes/compartments made of plastic or other materials, with at least one open wall and having entries/apertures defined in other walls—are often installed in buildings at points where electrical wires are to be connected to components such as sockets, switches, outlets, and/or other wires. A junction box is installed at the point where the connection is desired, usually within the building wall or ceiling, by nailing or screwing the junction box to a stud within the wall or ceiling. Multi-wire cable is brought to the junction box and extended through an entry point in a junction box wall to enter the junction box interior. The cable is usually sheathed within a corrugated cover, often formed of a helically wound ribbon of metal or plastic, which serves to protect the wires of the cable while maintaining much of the cable's flexibility.

Since it is often desirable to firmly secure the cable to the junction box at its point of entry, connectors have been developed which engage the corrugated cable cover and the junction box together, and prevent the cable from being easily pulled from the junction box. See, e.g., U.S. Pat. Nos. 5,214,247 to Tamm and 6,817,895 to Kiely. However, these often require that the connector be crimped about the cable cover, and/or that a screw or similar fastener be extended through the connector to engage the cable cover. These arrangements can be inconvenient because they require the use of tools to connect the cable to the junction box, and in some instances the connection may need to be performed within tight confines (e.g., within a small hole in a wall), making the operation difficult to perform. Additionally, the need to use tools increases the time needed to install cables within junction boxes, since the steps of inserting and fixing the connector within the junction box, inserting the cable within the connector, obtaining and using a tool to fix the cable within the connector, etc. often require that an electrician or other installer pick items up, set them down, switch them from hand to hand, etc., which can rapidly grow tedious and annoying.

Another drawback of connectors is their cost, which is largely a function of the processes used to manufacture them. Connectors are often made of cast metal or molded plastic, and the casting/molding processes—which must be somewhat precise for a high-quality connector—add cost to the connectors. Connector costs can significantly add to the overall cost of a wiring project, particularly since it is often necessary to use hundreds or thousands of the connectors. Thus, even a small reduction in the manufacturing cost of each connector can result in substantial overall savings.

SUMMARY OF THE INVENTION

The invention involves a cable connector which is intended to ease connection of cables to electrical boxes (i.e., junction boxes, fuse boxes, and similar structures), and at least partially address the aforementioned problems. To give the reader a basic understanding of some of the advantageous features of the invention, following is a brief summary of a preferred version of the cable connector. As this is merely a summary, it should be understood that more details regarding preferred versions may be found in the Detailed Description set forth elsewhere in this document. The claims set forth at the end of this document then define the various versions of the invention in which exclusive rights are secured.

It is initially useful to refer to the accompanying drawings, which illustrate an exemplary cable connector 100 in FIGS. 1-3 in both assembled form (FIG. 1) and disassembled form (FIGS. 2-3), and in FIGS. 5 and 6 in states immediately prior to installation in a wall aperture 202 of an electrical box 200 with a cable 300 (FIG. 5), and after such installation (FIG. 6). Referring particularly to FIGS. 1-3, the cable connector 100 has an elongated body 102 with an inner body passage 104 for receiving the cable 300, one or more outer legs 106 for securing the connector 100 within a wall aperture 202 formed a wall 204 of an electrical box 200, and one or more inner prongs 108 (see FIGS. 2-4) for securing the cable 300 within the connector 100 (best seen in FIG. 4, which presents a cross-sectional view of the body 102). The connector 100 preferably also includes a bushing 110 which eases insertion of the cable 300 (and which may also assist in insulating the cable 300 with respect to the body 102, if the body 102 is conductive), and a sleeve 112 which may assist in retaining the body 102 in a desired configuration (as will be reviewed shortly). Each of these parts is discussed in turn below in greater detail.

Referring particularly to FIGS. 1-3, the body 102 extends between an insertion end 114 designed for insertion into a wall aperture 202, and an opposing receiving end 116 which receives the cable 300 to be secured (as seen in FIGS. 5 and 6). The body 102 is preferably at least partially formed of sheet material, most preferably a sheet of spring steel or other resiliently flexible material, which is stamped or otherwise cut to define a series of elongated body sections 118 which are joined at the insertion end 114, and which extend therefrom in a manner similar to the petals of a flower. As best seen in FIGS. 2-3, these body sections 118 are bent/folded from the insertion end 114 to extend adjacently towards the receiving end 116, with body slots 120 being defined between the adjacent body sections 118. The resulting body 102 has an outer body surface 122 with an at least substantially circular circumference, and an opposing inner body surface 124 which surrounds the inner body passage 104, with the body passage 104 extending between the insertion end 114 and the receiving end 116.

One or more resiliently flexible legs 106 are affixed to the body 102 at or adjacent the insertion end 114, and extend towards the receiving end 116, to serve as bendable latches for securing the connector 100 within a wall aperture 202 when the connector 100 is inserted therein (as shown in FIG. 6). As best seen in FIGS. 2-4, the leg 106 is preferably formed by defining a cut in the body 102 to bound a portion of the leg 106 (e.g., a U-shaped cut), with the leg 106 then being bent outwardly from the body 102 to define a leg aperture 126 in the body 102 adjacent the leg 106. The leg 106 therefore has an inner leg surface 128 (FIG. 4) facing inwardly toward the inner body passage 104, and an opposing outer leg surface 130 (best seen in FIGS. 1-3). The outer leg surface 130 preferably has a leg channel 132 defined therein (see particularly FIG. 4), with the leg channel 132 being oriented at least substantially perpendicular to the longitudinal axis of the elongated body 102, whereby insertion of the insertion end 114 within the wall aperture 202 of an electrical box 200 causes the leg 106 to flex inwardly until the electrical box wall 204 is received within the channel 132, at which point the leg 106 will flex outwardly to secure the leg 106 on the electrical box wall 204. The leg channel 132 may be defined by a pair of leg tabs 134 spaced lengthwise along the leg 106, with a first leg tab 134 spaced closer to the insertion end 114 and a second leg tab 136 being closer to the receiving end 116. To ease insertion of the insertion end 114 within the wall aperture 202, the first leg tab 134 preferably slopes outwardly from the outer leg surface 130 as the first leg tab 134 extends away from the insertion end 114 (see particularly FIG. 4).

As previously noted (and as best seen in the cross-sectional view of the body 102 provided by FIG. 4), one or more flexible prongs 108 are then provided to assist in securing the cable 300 within the body 102. The prong 108 is also preferably formed by a cut in the body 102 which bounds a portion of the prong 108, leaving a prong base 138 bound to the body 102 at or adjacent to the receiving end 116, and with the remainder of the prong 108 extending toward the insertion end 114 to terminate in a prong tip 140. The prong 108 is then bent inwardly from the body 102 to define a prong aperture 142 in the body 102 adjacent the prong 108 (see also FIGS. 2-3). The prong tip 140 may be bent further inwardly with respect to the remainder of the prong 108 so that it may better grasp a cable 300 fit within the receiving end 116, with the prong tip 140 being fit within a groove in the corrugated sheath covering the cable 300. Owing to the inward bend of the prongs 108, the prongs 108 flex outwardly as a cable 300 is inserted from the receiving end 116 of the inner body passage 104, but will offer resistance to the withdrawal of a cable 300. As also best seen in FIG. 3, different prongs 108 may have different lengths so that the prong tips 140 are staggered along the length of the inner body passage 104 whereby the prong tips 140 are better received at different sections along the length of a spiral groove in the cover of the cable 300.

Where the body 102 is formed of sheet material (which may have sharp edges), and/or is formed of conductive material, it is useful to provide a bushing 110 within the inner body passage 104 at the insertion end 114 as shown in FIGS. 1-3 to ease the passage of the cable 300 through the inner body passage 104 and/or to insulate the cable 300 with respect to the body 102. As best seen in FIGS. 2-3, the bushing 110 preferably has a smooth inner bushing surface 144 which surrounds an inner bushing passage 146 for accepting cable 300, and an opposing circumferential outer bushing surface 148 having a bushing channel 150 (FIGS. 2-3) which receives the portion of the body 102 bounding the inner body passage 104 at the insertion end 114. The bushing channel 150 may be defined between a bushing flange 152 and one or more bushing tabs 154 spaced along the length of the bushing 110, thereby allowing installation of the bushing 110 in the body 102 by inserting it from the position shown in FIG. 2 to the installed position shown in FIG. 1.

Further, where the body 102 is defined by sheet material formed into body sections 118, wherein the body sections 118 are then bent/folded into a generally tubular/cylindrical configuration (as illustrated by the body 102 as shown in FIGS. 2-4), it can be useful to provide a sleeve 112 which retains the body sections 118 in this configuration. As best seen in FIGS. 2-3, the sleeve 112 has an inner sleeve surface 156 surrounding an inner sleeve passage 158, and preferably includes sleeve tabs 160 protruding inwardly from the inner sleeve surface 156 into the sleeve passage 158 and sleeve ridges 162 extending inwardly along the length of the inner sleeve passage 158. When the sleeve 112 is fit over the receiving end 116 as shown in FIG. 1, the sleeve ridges 162 fit within the body slots 120 defined between the body sections 118, and the sleeve tabs 160 extend into the leg apertures 126 defined in the body section 102 adjacent the legs 106, thereby firmly engaging the sleeve 112 to the receiving end 116 and deterring outward flexure of the body sections 118, and thereby better maintaining engagement between the prongs 108 at the receiving end 116 and an inserted cable 300.

The cable connector 100 thereby allows an easy means of securing a cable 300 within an aperture 202 in a wall 204 of an electrical box 200: as can be envisioned from review of FIGS. 5-6, a user may readily insert the insertion end 114 of the assembled connector 100 (FIG. 1) into a wall aperture 202, flexing the legs 106 inwardly until the wall 204 is received within the leg channels 132 (at which point the legs 106 flex outwardly to secure the wall 204 within the channels 132). Afterwards (or beforehand), the user may insert the cable 300 into the receiving end 116, flexing the prongs 108 inwardly as the prong tips 140 ride over the corrugations on the cover of the cable 300 and snap into the grooves between the corrugations. The foregoing operations may be performed with a single hand, and may be done by "feel," i.e, a user does not necessarily have to see the connector 100, electrical box 200, and cable 300 when performing these operations (as when the electrical box 200 may be obscured behind a wall). The user need not actuate structure on the connector 100 to perform the foregoing operations—e.g., there are no screws or similar structure requiring manipulation—and no tools are necessary for installation and use. Further, the connector 100 can be exceedingly inexpensive to manufacture, particularly where the body 102 is formed of stamped/cut and folded sheet material (such as spring steel) with plastic sleeves 112 and bushings 110, thereby avoiding the forming and material costs of more bulky molded connectors. In addition, the compact size and light weight of the connector 100 in comparison to most prior connectors allow further materials, manufacturing, shipping, and storage savings.

Further advantages and features of the foregoing exemplary version of the invention, as well as of alternative versions, are discussed in greater detail below.

BRIEF DESCRIPTION OF THE DRAWINGS

FIG. 1 is a perspective view of an exemplary connector 100 shown fully assembled, with the connector 100 having a body 102 with an insertion end 114, an opposing receiving end 116, and an inner body passage 104, and with the insertion end 114 bearing outwardly protruding legs 106 and a bushing 110 installed in the body passage 104, and with the receiving end 116 bearing a sleeve 112 installed about the body 102 to maintain its body sections 118 together.

FIG. 2 is an exploded (disassembled) perspective view of the connector 100 shown with the insertion end 114 of the body 102 facing toward the foreground, with the bushing 110 and sleeve 112 shown spaced from the body 102.

FIG. 3 is an exploded (disassembled) perspective view of the connector 100 shown with the receiving end 116 of the body 102 facing toward the foreground, with the bushing 110 and sleeve 112 shown spaced from the body 102.

DETAILED DESCRIPTION OF PREFERRED VERSIONS OF THE INVENTION

The foregoing discussion relates to an exemplary preferred version of the cable connector, and it should be understood that the invention is not limited solely to this exemplary version. Numerous modifications are possible, and examples follow.

First, while the preferred connector 100 depicted in the accompanying drawings preferably has a body 102 formed of stamped/cut metal, and a bushing 110 and sleeve 112 formed of plastic, these components may be formed of other materials, and may be formed separately (as shown) or integrally, such that two or more of these components are formed as a single part. For example, all of the components may be molded as a unit from plastic, or stamped, bent and drawn from metal (preferably nonconductive metal). Use of other materials, such as ceramics or composite materials, is also possible.

Figure 4:
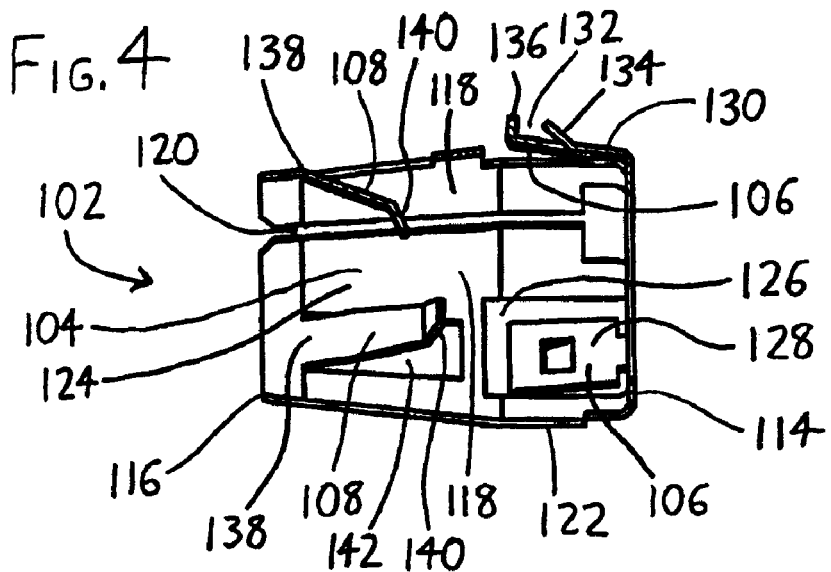
FIG. 4 is a cross-sectional view of the body 102, shown halved along its length, and showing the legs 106 sloping outwardly from the body 102, and having a channel 132 for receiving the wall of an electrical box, and also showing prongs 108 with different lengths extending into the body passage 104 to clasp a cable inserted therein.
Figure 5:
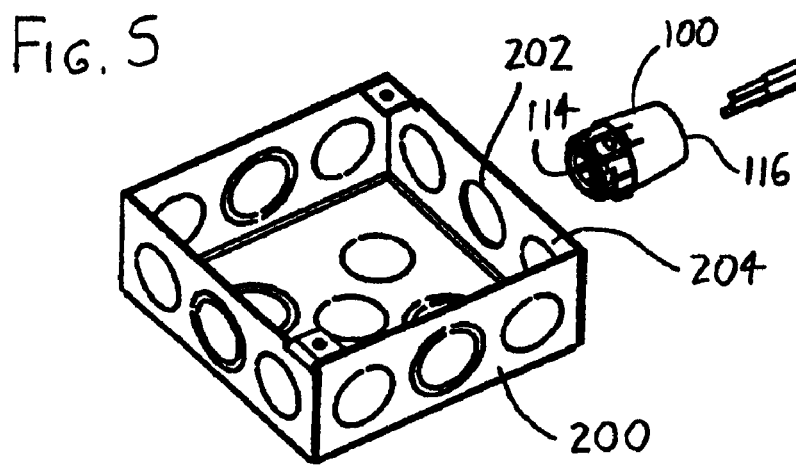
FIG. 5 illustrates the connector 100 shown in a ready-to-install state next to an exemplary electrical (junction) box 200 and a cable 300.
Figure 6:
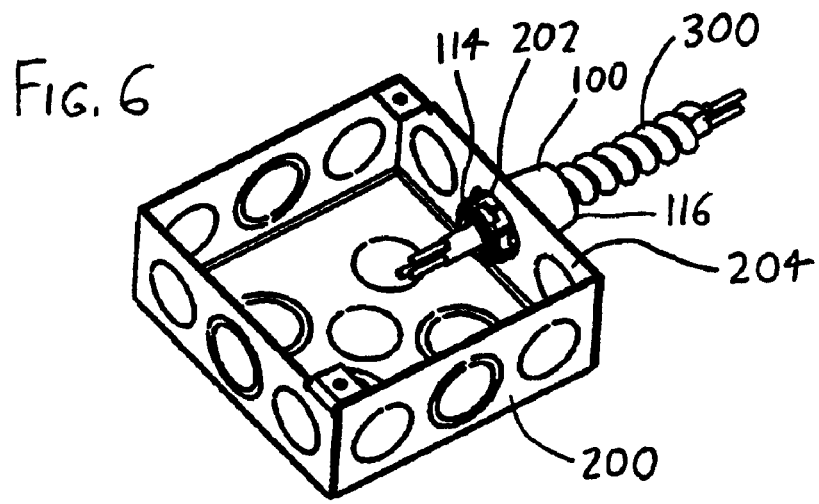
FIG. 6 illustrates the connector 100 shown in an installed state, with the connector having its insertion end 114 fixed within a wall aperture 202 in the electrical box 200, and with the cable 300 extending through the connector 100.

Second, the various components of the connector 100 may be configured with vastly different shapes than those depicted. For example, the body 102 might be directly formed from a tubular member, without any body slots 120 segmenting the body 102 into body sections 118 (in which case the sleeve 112 might not be included). The legs 106 need not be formed in the body sections 118 (as seen in FIGS. 1-4), and could instead be formed between adjacent body sections 118. The prongs 108 also need not be formed within the body sections 118, and could instead be formed as projections from the tips of the body sections 118 (i.e., from the receiving end 116) which are bent inwardly into the body passage 104. The legs 106 could be similarly be formed of projections bent outwardly from the insertion end 114. The legs 106 and/or prongs 108 need not be integrally formed with the body 102, and could instead be formed as a part of the bushing 110 and/or sleeve 112, and could extend through the body 102 into the positions shown in the drawings. As noted above, the sleeve 112 is not absolutely necessary, and the bushing 110 could also or alternatively be omitted. A wide variety of other variations in the configurations of the body 102, bushing 110, and sleeve 112 are possible as well.

In any event, the invention is not intended to be limited to the preferred version of the connector described above (and/or to the foregoing exemplary modifications), but rather is intended to be limited only by the claims set out below. Thus, the invention encompasses all different connectors that fall literally or equivalently within the scope of these claims.

What is claimed is:

1. A cable connector for securing a cable in a wall aperture comprising:
   a. an elongated body extending between an insertion end and an opposing receiving end, the body having
      (1) an outer body surface with an at least substantially circular circumference, and
      (2) an opposing inner body surface surrounding an inner body passage extending from the insertion end to the receiving end,
      wherein the body is formed of a series of elongated body sections joined at or adjacent the insertion end and adjacently extending toward the receiving end, with body slots being defined between the adjacent body sections,
   b. at least one resiliently flexible elongated leg extending outwardly from the outer body surface, the leg having:
      (1) a leg base affixed to the body at or adjacent the insertion end, the leg extending therefrom toward the receiving end to terminate in a leg tip,
      (2) a inner leg surface facing toward the longitudinal axis of the elongated body and an opposing outer leg surface, wherein the outer leg surface includes a leg channel defined therein, the leg channel being oriented at least substantially perpendicular to the longitudinal axis of the elongated body;
   c. at least one resiliently flexible elongated prong extending inwardly from the inner body surface, the prong having a prong base affixed to the body at or adjacent the receiving end, the prong extending therefrom toward the insertion end to terminate in a prong tip,
   d. a sleeve having an inner sleeve surface surrounding an inner sleeve passage, wherein:
      (1) the sleeve has sleeve ridges defined along the inner sleeve passage, and
      (2) the sleeve is fit over the receiving end, with:
         (a) the receiving end, and
         (b) at least a portion of the body sections,
         being fit within the inner sleeve passage with the sleeve ridges being fit within the body slots,
   whereby:
   i. the insertion end of the body may be inserted into a wall aperture within a wall to situate the wall within the leg channel, and
   ii. a cable may be inserted into the inner body passage at the receiving end of the body to have the prong engage the cable therein.

2. The cable connector of claim 1 wherein the leg channel is defined by a pair of leg tabs spaced lengthwise along the leg, with a first leg tab spaced closer to the insertion end and a second leg tab being closer to the receiving end.

3. The cable connector of claim 2 wherein the first leg tab slopes outwardly from the outer leg surface as it extends toward the leg tip.

4. The cable connector of claim 1 further comprising several resiliently flexible elongated prongs, wherein the prongs have different lengths.

5. The cable connector of claim 1 wherein the prong tip has a prong tab extending inwardly therefrom.

6. The cable connector of claim 1 wherein the leg is defined as a portion of the body, with a cut being formed in the body to bound a portion of the leg, and with the leg being bent outwardly from the body to define a leg aperture in the body adjacent the leg.

7. The cable connector of claim 6:
   a. further comprising a sleeve having an inner sleeve surface surrounding an inner sleeve passage, with a sleeve tab protruding inwardly from the inner sleeve surface into the sleeve passage;
   b. wherein the sleeve is fit over the receiving end, with the receiving end fit within the inner sleeve passage and with the sleeve tab extending into the leg aperture.

8. The cable connector of claim 1 wherein the prong and leg are longitudinally aligned with each other.

9. The cable connector of claim 1 wherein the body is also at least partially formed of sheet material folded to adjacently situate the body sections.

10. The cable connector of claim 1:
    a. further comprising a bushing having an outer bushing surface and an opposing inner bushing surface, wherein:
       (1) the outer bushing surface has a bushing channel defined therein, and;

(2) the inner bushing surface surrounds an inner bushing passage; and b. the bushing is fit within the inner body passage at the insertion end, with a portion of the body being received within the bushing channel.

11. A cable connector for securing a cable in a wall aperture comprising:
  a. an elongated body extending between an insertion end and an opposing receiving end, the body being formed of a series of elongated body sections joined at or adjacent the insertion end and extending adjacently toward the receiving end, wherein the body sections define:
    (1) an outer body surface with an at least substantially circular circumference, and
    (2) an opposing inner body surface surrounding an inner body passage extending from the insertion end to the receiving end,
  b. at least one resiliently flexible elongated leg, each leg extending:
    (1) outwardly from the outer body surface, and
    (2) toward the receiving end,
    each leg being defined as a portion of the body, with each leg being bent outwardly from the body to define a leg aperture in the body adjacent the leg,
  c. at least one resiliently flexible elongated prong, each prong extending:
    (1) inwardly from the inner body surface, and
    (2) toward the insertion end,
  d. a sleeve having:
    (1) an inner sleeve surface surrounding an inner sleeve passage,
    (2) a sleeve tab protruding inwardly from the inner sleeve surface into the sleeve passage, and
    (3) sleeve ridges defined along the inner sleeve passage,
    wherein the sleeve is fit over the receiving end, with:
    (a) the receiving end, and
    (b) at least a portion of the body sections,
    being fit within the inner sleeve passage, and with the sleeve tab extending into the leg aperture and with the sleeve ridges being fit within body slots defined between the body sections;
  whereby:
    i. the insertion end of the body may be inserted into a wall aperture to have the leg engage the wall, and
    ii. a cable may be inserted into the inner body passage at the receiving end of the body to have the prong engage the cable therein.

12. A cable connector for securing a cable in a wall aperture comprising:
  a. a series of elongated body sections:
    (1) adjacently extending between an insertion end at which the body sections are joined, and an opposing receiving end, with body slots being defined between the adjacent body sections,
    (2) defining:
      (a) an outer body surface with an at least substantially circular circumference, and
      (b) an opposing inner body surface surrounding an inner body passage extending from the insertion end to the receiving end,
  b. at least one resiliently flexible elongated leg, each leg having a leg base affixed to one or more body sections at or adjacent the insertion end and:
    (1) extending therefrom toward the receiving end to terminate in a leg tip, and
    (2) extending outwardly from the outer body surface;
  c. at least one resiliently flexible elongated prong, each prong having a prong base affixed to a body section at or adjacent the receiving end and:
    (1) extending therefrom toward the insertion end to terminate in a prong tip, and
    (2) extending inwardly from the inner body surface,
  d. a sleeve having an inner sleeve surface surrounding an inner sleeve passage, wherein the sleeve:
    (1) is fit over the receiving end, and
    (2) has sleeve ridges defined along the inner sleeve passage, with the sleeve ridges being fit within the body slots.

13. The cable connector of claim 12 wherein the sleeve has a sleeve tab protruding inwardly from the inner sleeve surface into the sleeve passage, with the sleeve tab extending into a leg aperture defined in the body section adjacent the leg.

14. The cable connector of claim 11 wherein:
  a. the cable connector includes at least two resiliently flexible elongated prongs, and
  b. the prongs have different lengths.

15. The cable connector of claim 11 wherein each prong is longitudinally aligned with one of the legs.

16. The cable connector of claim 12 wherein:
  a. the cable connector includes at least two resiliently flexible elongated prongs, and
  b. the prongs have different lengths.

17. The cable connector of claim 11 wherein the leg includes a leg channel defined therein, the leg channel being oriented at least substantially perpendicular to the longitudinal axis of the elongated body.

18. The cable connector of claim 17 wherein the leg channel is defined by a pair of leg tabs spaced lengthwise along the leg, with a first leg tab spaced closer to the insertion end and a second leg tab being closer to the receiving end.

19. The cable connector of claim 12 wherein the leg includes a leg channel defined therein, the leg channel defining a space oriented at least substantially perpendicular to the longitudinal axis of the elongated body.

20. The cable connector of claim 19 wherein the leg channel is defined by a pair of leg tabs spaced lengthwise along the leg, with a first leg tab spaced closer to the insertion end and a second leg tab being closer to the receiving end.

* * * * *